(12) United States Patent
Brandt et al.

(10) Patent No.: US 8,196,970 B2
(45) Date of Patent: Jun. 12, 2012

(54) CONNECTOR DEVICE FOR MEDIA CONDUITS

(75) Inventors: Josef Brandt, Wipperfürth (DE); Harald Hagen, Wipperfürth (DE); Martin Lechner, Lindlar (DE); Norbert Terlau, Kürten (DE); Günter Sieper, Remscheid (DE)

(73) Assignee: Voss Automotive GmbH, Wipperfurth (DE)

( * ) Notice: Subject to any disclaimer, the term of this patent is extended or adjusted under 35 U.S.C. 154(b) by 869 days.

(21) Appl. No.: 12/065,291

(22) PCT Filed: Aug. 29, 2006

(86) PCT No.: PCT/EP2006/065775
§ 371 (c)(1),
(2), (4) Date: Jul. 21, 2008

(87) PCT Pub. No.: WO2007/025966
PCT Pub. Date: Mar. 8, 2007

(65) Prior Publication Data
US 2008/0277923 A1    Nov. 13, 2008

(30) Foreign Application Priority Data

Aug. 30, 2005 (DE) ............... 20 2005 013 691 U

(51) Int. Cl.
*F16L 25/00* (2006.01)
(52) U.S. Cl. ........ 285/331; 285/104; 285/108; 285/307; 285/319

(58) Field of Classification Search .............. 285/104, 285/108, 243, 305, 307, 319, 322–323, 921
See application file for complete search history.

(56) References Cited

U.S. PATENT DOCUMENTS

| 4,431,216 A * | 2/1984 | Legris | 285/104 |
| 5,711,550 A * | 1/1998 | Brandt | 285/101 |

FOREIGN PATENT DOCUMENTS

| DE | 20 2005 009 575 U1 | 10/2006 |
| EP | 0 733 844 | 9/1996 |
| WO | WO 2004/029497 A1 | 4/2004 |
| WO | WO 2005/028939 A1 | 3/2005 |
| WO | WO 2005/064221 A1 | 7/2005 |

* cited by examiner

*Primary Examiner* — Aaron Dunwoody
*Assistant Examiner* — Fannie Kee
(74) *Attorney, Agent, or Firm* — Brinks Hofer Gilson & Lione

(57) ABSTRACT

A connector device having a housing part and a clamping ring arranged in the receiving hole and cooperating with an inner cone of the housing part to lock a plugged-in media conduit. An inner insertion piece is removably connected to a base piece and provided with the inner cone. The insertion piece has at least two radially elastic spring arms to enable removal of the conduit. Radially outward-protruding catching extensions of the spring arms engage catching holes for detaching purposes. A contamination seal is disposed in the region of free ends of the spring arms to circumferentially rest upon the media conduit. The catching extensions are disconnected from the sealing area via a deformation zone so that the radial detaching movement of the catching extensions is performed without being influenced by the contamination seal because the deformation zone is deformed.

19 Claims, 9 Drawing Sheets

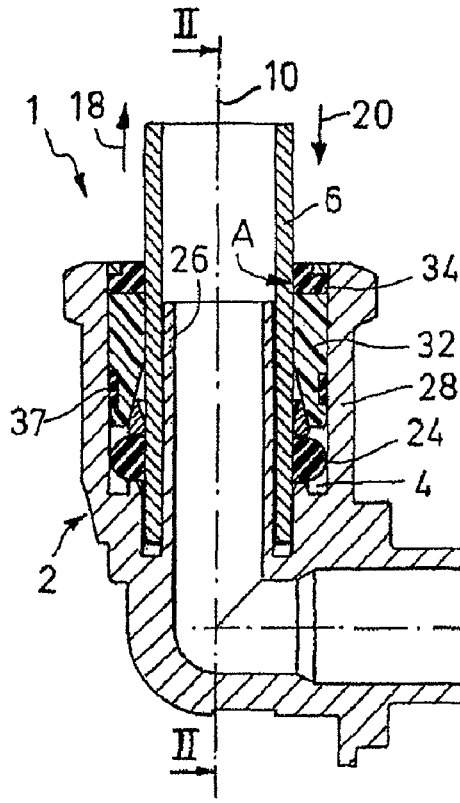
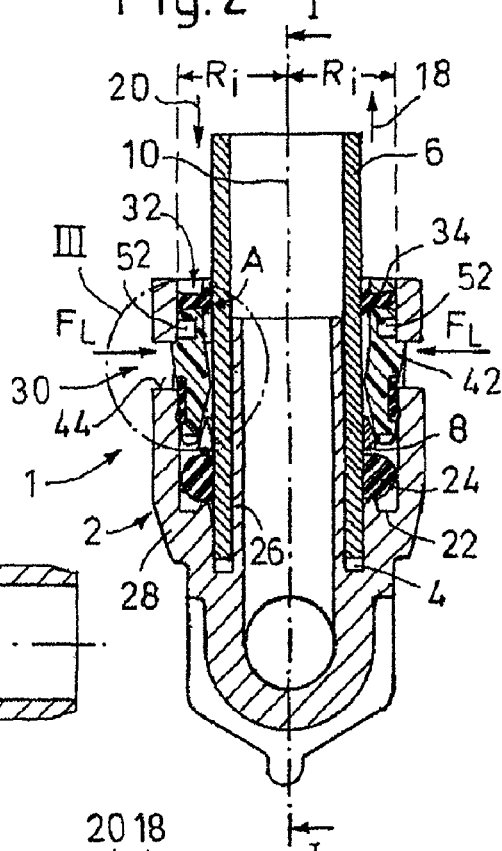
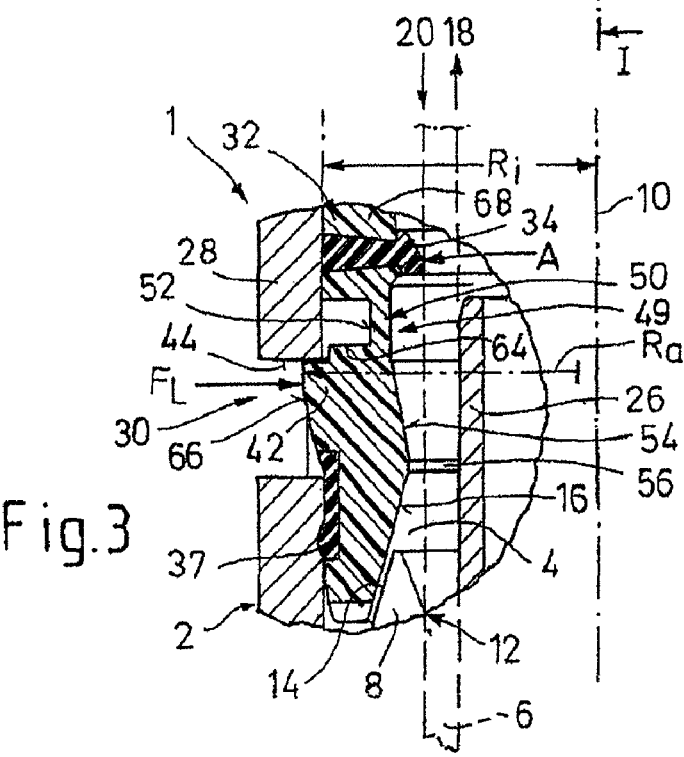

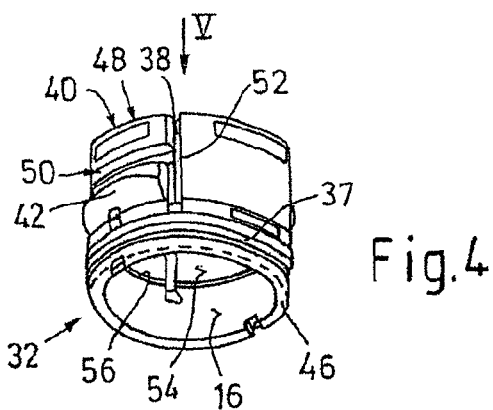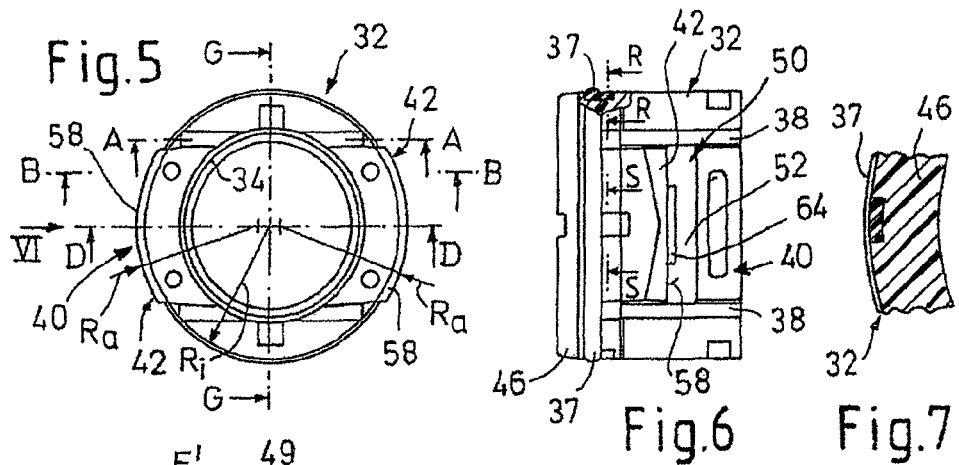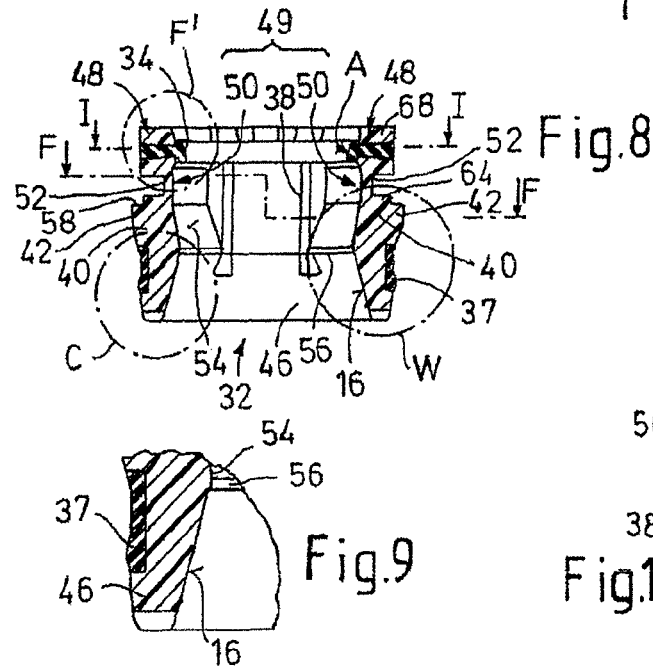

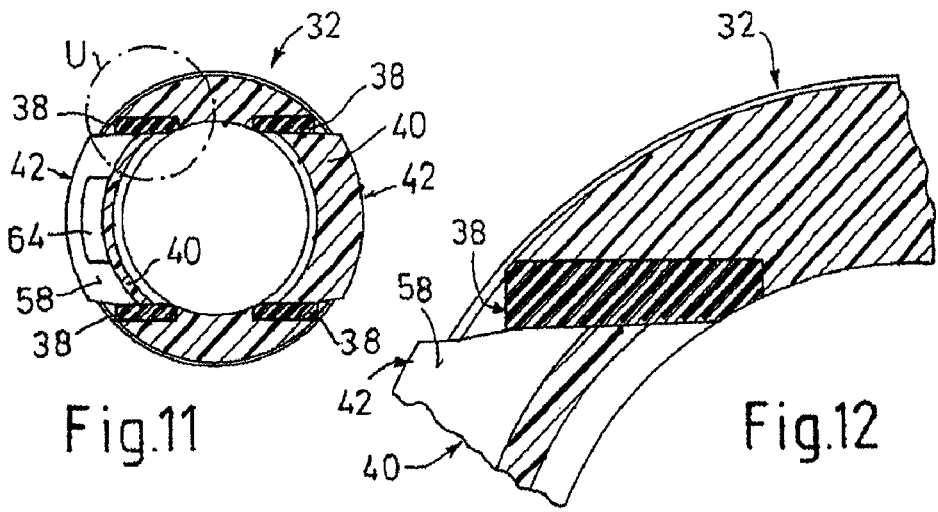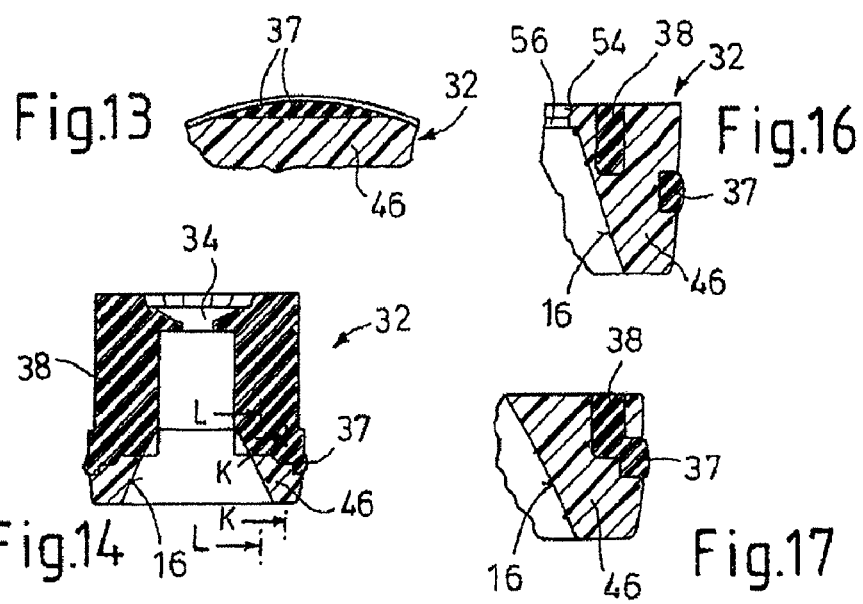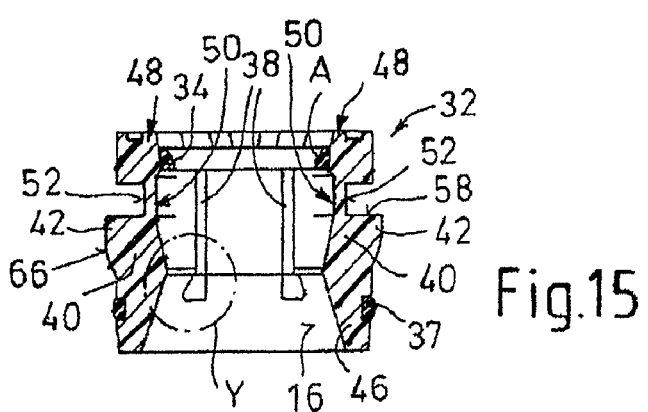

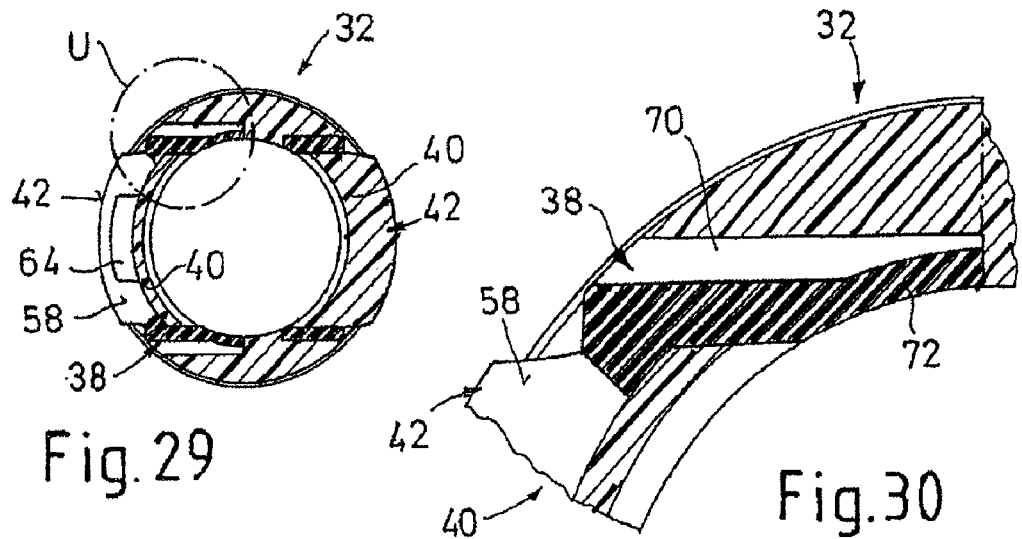
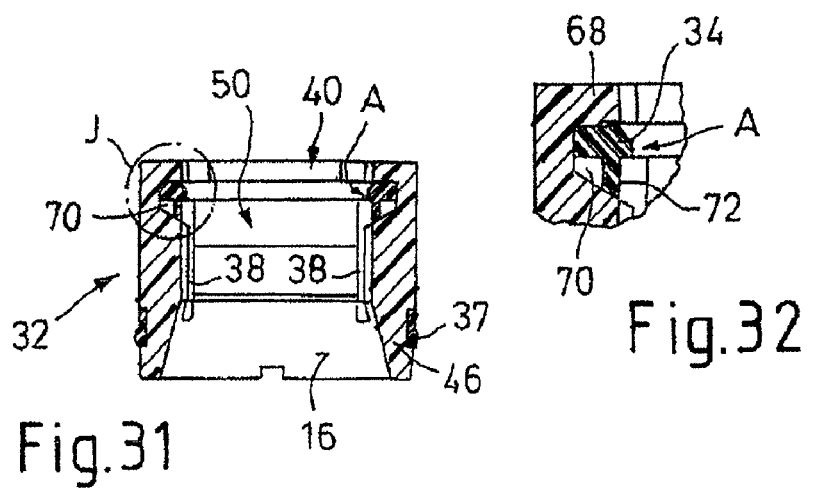

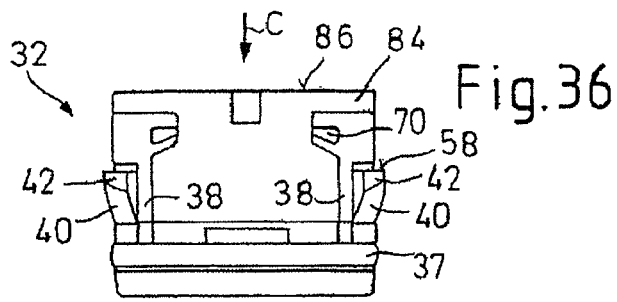
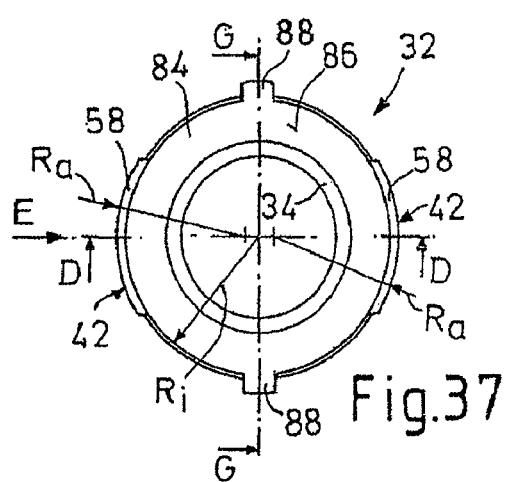
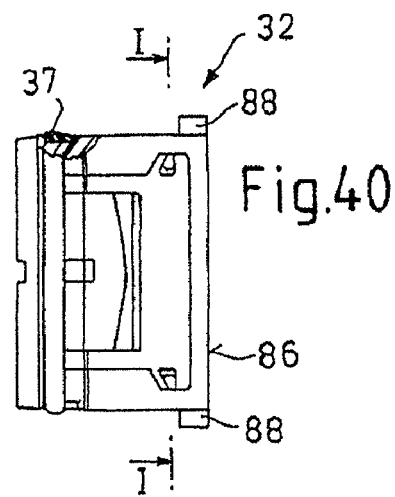
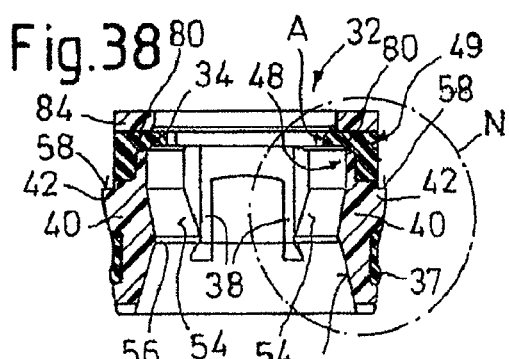
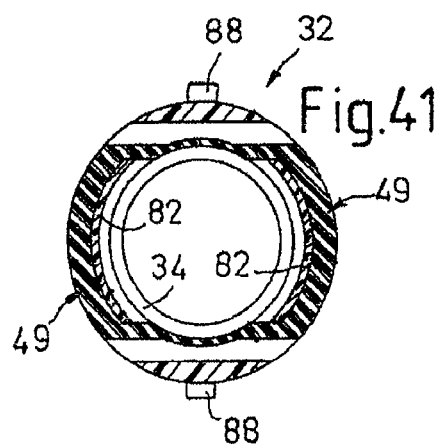
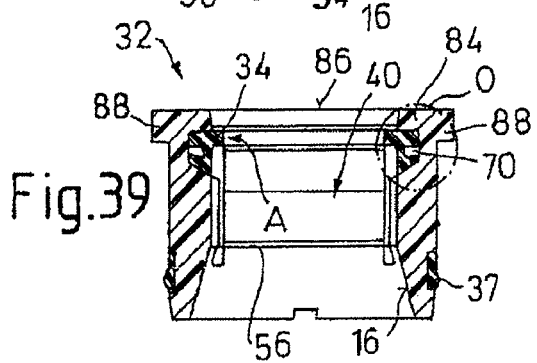
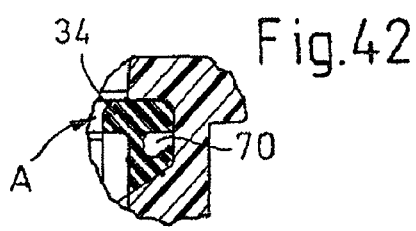

CONNECTOR DEVICE FOR MEDIA CONDUITS

CROSS REFERENCE TO RELATED APPLICATIONS

This application claims priority to PCT international patent application number PCT/EP2006/065775, filed Aug. 29, 2006 and German utility model 20 2005 013 691.3, filed Aug. 30, 2005.

FIELD OF THE INVENTION

The present invention relates to a connection device for the plug-type connection of at least one media conduit (pipeline or hose pipe for gases or liquids).

BACKGROUND OF THE INVENTION

Such a connection device is described both in WO 2004/029497 A1 and in WO 2005/028939 A1. In this known embodiment, the insert part is in the form of a sleeve and is inserted into an enlarged portion of the receiving opening of the base part so as to be circumferentially sealing at least with respect to the ingress of dirt or such contaminants. The insert part in the inserted state lies completely within the base part so as to terminate flush on the mouth side. Furthermore, the insert part comprises a first, relatively harder dimensionally stable plastic material, a dirt seal being integrally formed cohesively from a second, relatively softer and elastic plastic material in the free, mouth-side end region of the spring arms. The insert part is therefore in the form of an integral multi-component molding made from plastic. The spring arms are formed by longitudinal slots of the sleeve-shaped insert part, the longitudinal slots likewise being filled with the injected material of the dirt seal. In the known connection device, it has been shown in practical use that it is sometimes very difficult to detach the conduit by removing the insert part from the base part.

SUMMARY OF THE INVENTION

The present invention is based on the object of improving a connection device of the type mentioned in such a way that the detachment process is simplified whilst maintaining secure locking of the inserted media conduit.

Accordingly the invention provides that the latching shoulders of the spring arms are decoupled from the sealing region of the dirt seal with respect to their radial detachment movement via a deformation zone in such a way that the radial detachment movement of the latching shoulders as a result of the deformation of the deformation zone, with respect to a detaching force to be applied for the detachment movement, takes place substantially uninfluenced by the dirt seal, which rests radially on the media conduit. This achieves an advantageously low detachment force for the detachment movement.

A first embodiment provides that each spring arm has, as a deformation zone in a region lying between an inner cone and a free spring arm end, a weakening zone with reduced flexural stiffness in such a way that, when the free spring arm end is radially supported on the conduit (preferably indirectly via a dirt seal provided in this region), the latching shoulder is capable of moving radially inward into its detachment position under elastic bending deformation of the weakening zone. For this purpose, a lower radial detachment force is advantageously sufficient because the weakening zone according to the invention makes it possible to achieve a situation in which the free end region, which is preferably supported on the conduit circumference via the dirt seal, of each spring arm does not counteract the radial detachment movement, or only counteracts it to a lesser extent. This means that the latching shoulders of the spring arms with respect to their radial detachment movement are in practice decoupled from the free end region (preferably from the region of the dirt seal). The latching shoulders can therefore move radially with a low radial detachment force, without or with only unsubstantial movement of the spring arms in the end-side region. As a result, overall the detachability is markedly improved. By virtue of the fact that the weakening zone is in each case preferably arranged axially between the latching shoulder and the free spring arm end, in practice, a flexible joint is formed between these regions.

In a second embodiment of the invention, the spring arms with their free ends are decoupled from the mouth-side end of the sleeve-shaped insert part via axial interspaces, the deformation zone being formed by regions of an elastic plastic material which are arranged in the region of the free spring arm ends and in the interspaces and are integral with the dirt seal, in such a way that during the radial detachment movement of the latching shoulders, the free spring arm ends are correspondingly concomitantly moved radially under the elastic material deformation of the plastic material of the deformation zone. This may also result proportionally in a bending deformation in the region of the free ends of the spring arms.

In the preferred embodiments, by virtue of the fact that the spring arms are decoupled from the mouth side of the insert part, the latter can be formed at its mouth-side end with a ring section, which is continuous in the circumferential direction, with a planar, front end ring face. This ensures improved support of the dirt seal in particular in the axial direction.

Despite the improved detachability as a result of the invention, at the same time there is also a high level of protection against undesired detachment. For this purpose, preferred configurations will be explained in the text which follows.

BRIEF DESCRIPTION OF THE DRAWINGS

In the text which follows, the invention will be explained in more detail with reference to preferred exemplary embodiments illustrated in the figures of the drawing, in which:

FIG. 1 shows an axial section of a first embodiment of a connection device according to the invention in a first section plane (plane I-I shown in FIG. 2), by way of example in an embodiment as an elbow connector with plugged media conduit, FIG. 2 shows an axial section in a second plane (II-II according to FIG. 1) which is arranged at right angles with respect to the plane according to FIG. 1, FIG. 3 shows an enlarged illustration of the region III in FIG. 2 with the media conduit only illustrated by dashed lines, FIG. 4 shows a perspective view of an insert part according to the invention, FIG. 5 shows an enlarged plan view of the insert part in the arrow direction V according to FIG. 4, FIG. 6 shows a partially sectioned side view in the arrow direction VI according to FIG. 5, FIG. 7 shows an enlarged partial section S-S according to FIG. 6, FIG. 8 shows a section D-D according to FIG. 5, FIG. 9 shows an enlarged illustration of the region C in FIG. 8, FIG. 10 shows an enlarged illustration of the region W in FIG. 8, FIG. 11 shows a cross section in two axially offset planes corresponding to the profile of the section line F-F in FIG. 8, FIG. 12 shows an enlarged illustration of the region U in FIG. 11, FIG. 13 shows an enlarged partial section R-R according to FIG. 6, FIG. 14 shows a section A-A according to FIG. 5, FIG. 15 shows a section B-B according to FIG. 5, FIG. 16 shows an enlarged section L-L according to FIG. 14, FIG. 17 shows an enlarged section K-K according to FIG. 14, FIG. 29 shows a cross section corresponding to the section line F-F in FIG. 27 (similar to FIG. 11), FIG. 30 shows an enlargement of the region U in FIG. 29 (similar to FIG. 12), FIG. 31 shows a section G-G in FIG. 25 (similar to FIG. 18), FIG. 32 shows an enlargement of the region J in FIG. 31 (similar to FIG. 19), FIG. 36 shows a side view of the insert part in the embodiment according to FIGS. 33 to 35, FIG. 37 shows a plan view of the mouth side in the arrow direction C according to FIG. 36, FIG. 38 shows an axial section in the plane D-D according to FIG. 37, FIG. 39 shows an axial section in the plane G-G according to FIG. 37 (rotated through 90° in the plane of the drawing), FIG. 40 shows a side view (sectioned in regions), of the insert part in the arrow direction E according to FIG. 37, FIG. 41 shows a section in the radial plane I-I according to FIG. 40, FIG. 42 shows a detail enlargement of the region b in FIG. 39.

DETAILED DESCRIPTION

Figure 18:
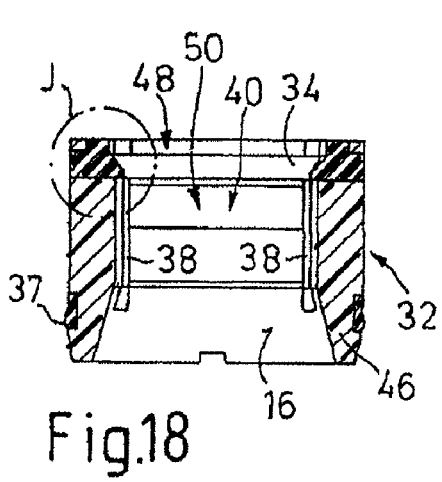
FIG. 18 shows a section G-G according to FIG. 5.
Figure 19:
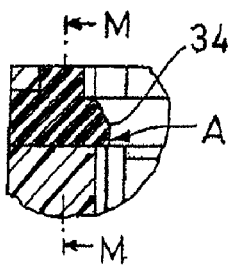
FIG. 19 shows an enlarged illustration of the region J in FIG. 18.
Figure 20:
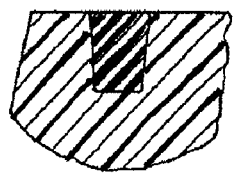
FIG. 20 shows an enlarged partial section M-M according to FIG. 19.
Figure 21:
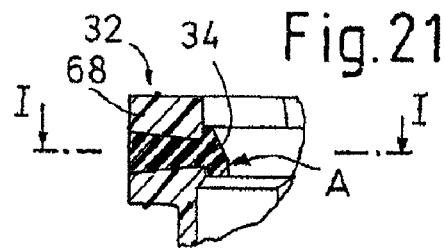
FIG. 21 shows an enlarged illustration of the region F' in FIG. 8.
Figure 22:
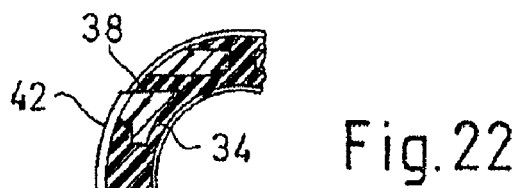
FIG. 22 shows a section in the plane I-I according to FIGS. 8 and 21.

In the various figures of the drawing, identical parts have always been provided with the same reference symbols, with the result that each description of a part, which may appear only once with reference to a specific drawing figure, also applies analogously with respect to the other figures of the drawing in which the part with the corresponding reference numeral can likewise be seen.

A connection device 1 according to the invention comprises, according to FIGS. 1 to 3 and FIGS. 33 to 35, a housing part 2 with, at least, one receiving opening 4, which is open at one end, for axially inserting an end of a media conduit 6 in the form of a pipeline or hose pipe and a clamping ring 8 which is arranged in the housing part 2 or within the receiving opening 4, for locking the axially, i.e. in the direction of a plug axis 10, inserted conduit 6. In this case, the connection device 1 makes it possible for the conduit 6, which in particular is made from plastic, to be fitted simply and quickly by means of simply being inserted into the housing part 2 without any other fitting steps. The clamping ring 8 rests in an enlarged portion of the receiving opening 4 in such a way that it surrounds the receiving opening 4 and therefore the inserted conduit 6. At a point on its circumference, the clamping ring 8 has an axially and radially continuous slot, i.e. an interruption in its circumferential profile, as a result of which it can be radially elastically enlarged and/or constricted. In its inner circumferential region, the clamping ring 8 (see in this regard in particular the larger illustrations in FIGS. 3 and 35) has (at least) one radially inwardly protruding, circumferential tooth edge 12. In addition, the clamping ring 8 has (at least) one outer cone 14, which interacts with an inner cone 16 of the housing part 2 for the purpose of locking the conduit 6 in such a way that when the conduit 6 is pulled in the detachment direction (arrow direction 18 in FIGS. 1 to 3), i.e. in the event of a movement counter to the insertion direction (arrow 20 in FIGS. 1 to 3), the clamping ring 8 is first carried along by the force-fitting bearing state of its tooth edge 12 until its outer cone 14 comes to rest in the inner cone 16 of the housing part 2. If the conduit is pulled further, a radially inwardly directed force is produced via the cones 14, 16, by means of which force the clamping ring 8 is elastically constricted, with the result that the tooth edge 12 interacts in a force-fitting and/or interlocking manner with the substantially smooth, cylindrical conduit outer circumference and, as a result, the conduit 6 is locked so as to prevent it from being withdrawn. In this case, an advantageous configuration, which is not illustrated, however, can provide that the inner cone 16 of the housing part 2 comprises two axially adjacent inner cone sections with different cone angles. A first inner cone section, which is positioned at a distance from the insertion side (mouth side of the housing receiving opening), is designed to have a first, relatively flat cone angle, and a second inner cone section, which is adjoining in the direction toward the insertion or mouth side, has a second, steeper cone angle. In this case, the outer cone 14 of the clamping ring 8 also comprises two axially adjacent outer cone sections with corresponding cone angles so as to match the inner cone sections. As a result of this configuration, shortening of the axial return path for locking purposes is achieved. Details in this regard are included in the earlier application DE 20 2005 009 575.3, to which full reference is therefore made.

In order to seal off the conduit 6 in a pressure-tight manner, a sealing ring 24 (pressure seal) is arranged within the housing part 2 in the region between the clamping ring 8 and a bore step 22. In addition, a supporting sleeve 26, which is coaxial with respect to the plug axis 10, is preferably arranged within the housing part 2 for engaging in the inserted conduit 6. The supporting sleeve 26 therefore supports the inserted or plugged-on, conduit 6 on the one hand against the radial force applied via the clamping ring 8 and on the other hand also against the bearing force of the sealing ring 24 from the inside. As a result, the connection device 1 according to the invention is in principle also suitable for relatively flexible hose pipes.

For, on the one hand, the producibility and fitability of the connection device 1 and, on the other hand, the detachability of the conduit 6, the housing part 2 is formed in two parts; it comprises a base part 28 and an insert part 32. The insert part 32 has the inner cone 16 and is connected to the base part 28 via an interlocking latching connection 30 (snap-action interlocking connection with an active face/undercut angle of greater than/equal to 90°). The insert part 32 has, on the mouth side, a dirt seal 34 with a sealing region A for bearing circumferentially on the inserted conduit 6. The insert part 32 is described in more detail further below with reference to the separate illustrations in FIGS. 4 to 23 and 36 to 43.

The above-described supporting sleeve 26, in the case of parts which have not been shaped by machining technology, is expediently designed to be integral with the base part 28, in particular as a molding made from plastic (see FIGS. 1 and 2). According to FIGS. 33 to 35, the supporting sleeve 26 can also be in the form of a separate insert part 26*a*. As a result, the insert part 26*a* with the supporting sleeve 26 on the one hand and the base part 28 on the other hand can comprise different materials.

Preferably, the insert part 32 with the dirt seal 34 is formed as an integral multicomponent molding comprising in particular at least two different plastic materials, to be precise the insert part 32 comprises a first, relatively harder and dimensionally stable plastic material, while the dirt seal 34 is integrally formed in one piece directly cohesively from a second, relatively softer and elastic plastic material. Preferably, this material is a thermoplastic elastomer (TPE). In this case, the dirt seal 34 has, on its side pointing radially inward, the seal region A for bearing circumferentially on the conduit 6.

The insert part 32 is formed together with the dirt seal 34 overall substantially in the form of a sleeve and inserted into an enlarged portion of the receiving opening 4 of the base part 28. In order to seal off the gap between the base part 28 and the insert part 32 against the ingress of dirt and the same contaminants, the insert part 32 has a seal 37 on its outer circumference. In the preferred embodiment illustrated, this seal 37 comprises a relatively soft elastic material and, for this purpose, is integrally formed in particular in one piece and cohesively in a similar manner to the dirt seal 34. The seal 37 therefore preferably comprises a TPE (thermoplastic elastomer). In this case, it is particularly advantageous if the insert part 32 in the inserted state lies completely within the base part 28 so as to terminate flush on the mouth side. This results in an advantageously compact design of the connection device 1, which has a planar end face, which is closed via the dirt seal 34 toward the conduit 6, on the mouth side.

For the detachability of the conduit 6, provision is made for the sleeve-shaped insert part 32 (see in this regard in particular the separate, enlarged illustrations in FIGS. 4 to 23 and 36 to 43) to have at least two radially elastic, diametrically opposite spring arms 40, which are formed by longitudinal slots 38. Each spring arm 40 engages with a radially outwardly protruding, tab-like latching shoulder 42 in an interlocking manner, i.e. with an undercut $\geq 90°$, in a corresponding latching opening 44 of the base part 28 in a detachable manner. The latching openings 44 are in this case in the form of radial through-openings, with the result that the latching shoulders 42 can be reached from the outside with a suitable tool and moved radially inward for detachment purposes, as a result of which the conduit 6 together with the clamping ring 8 and the insert part 32 can be removed (arrow direction 18 in FIGS. 1 to 3).

In the preferred configuration described, it is furthermore advantageous if the longitudinal slots 38 of the insert part 32 are completely filled with the material of the dirt seal 34 (see in this regard in particular the section A-A in the region of the longitudinal slots 38 in FIG. 14 and the cross section in FIG. 11). This configuration means that optimum dirt sealing is ensured since actual gaps are avoided even in the region of the longitudinal slots 38. Nevertheless, the elasticity of the sealing material filling the longitudinal slots 38 (in particular a TPE) allows for the necessary radial movement of the spring arms 40.

Alternatively, the dirt seals 34 and 37 can be embodied by separate elastomeric inserts (for example O rings). In this case, however, it is advantageous to fill the longitudinal slots 38 as described with an elastic material (TPE).

In the embodiments according to FIGS. 1 to 32 (see in this regard, for example, FIGS. 4, 6, 8, 14, 15 and 18), the longitudinal slots 38 forming the spring arms 40 run from the region of the inner cone 16 continuously as far as the opposite, mouth-side end of the sleeve-shaped insert part 32. As a result, the spring arms 40 extend starting from a circumferentially closed ring section 46, which has the inner cone 16, of the insert part 32 with its free ends 48 as far as the mouth side, where the free ends 48 are connected to the dirt seal 34.

According to the invention, it is now provided in all embodiments that the latching shoulders 42 of the spring arms 40 are decoupled from the region of the dirt seal 34 with respect to their radial detachment movement via a deformation zone 49 in such a way that the radial detachment movement of the latching shoulders 42 takes place substantially uninfluenced by the dirt seal 34, which is supported radially on the media conduit 6, with the principal deformation of the deformation zone 49 as regards a detachment force to be applied for the detachment movement. As a result, the detachment force is largely independent of an opposing force brought about by the dirt seal 34, with the result that, overall, an advantageously low detachment force is sufficient for actuating the latching shoulders 42.

In order to improve or facilitate the detachability of the latching connection 34, the embodiments according to FIGS. 1 to 32 provide that each spring arm 40 has, as a deformation zone 49, a weakening zone 50 with reduced flexural strength in such a way that, when the free spring arm end 48 is radially supported via the dirt seal 34 on the conduit 6, the latching shoulder 42 is capable of moving radially inward into its detachment position under elastic bending deformation of the weakening zone 50. In this regard, reference is made to the illustrations in FIGS. 2 and 3. If, for detachment purposes by means of a suitable tool (not illustrated) through the latching openings 44, in each case a radial detachment force $F_L$ is applied to the latching shoulders 42, as a result the spring arms 40 are moved (pivoted) overall elastically radially inward. Since, however, the free ends 48 of the spring arms 40 are supported, indirectly via the dirt seal 34, on the circumference of the media conduit 6, given a continued radial movement of the latching shoulders 42 in each case a bending deformation in the region of the weakening zone 50 occurs after a specific radial compression of the dirt seal 34, with the result that the weakening zone 50 acts as a flexible joint. As a result, in practice the free spring arm ends 48 are "decoupled" from the detachment force, i.e. the free ends 48 at most cause only a slight force which counteracts the detachment force $F_L$, as a result of which the detachment force $F_L$ is overall advantageously low.

In a preferred embodiment, the weakening zone 50 of each spring arm 40 is arranged in the region lying axially between the latching shoulder 42 and the dirt seal 34. In this case, advantageously the weakening zone 50 of each spring arm 40 can be formed by a cross-section reduction, to be precise by a cross-section reduction of at least 25% to at most approximately 75%, preferably of from 50% to 75% to from approximately 50% to 25%, of the original spring arm cross section which is provided in the adjoining regions of the spring arm 40. In this case, the cross-section reduction can be formed by an outer radial cutout and/or by an inner radial enlargement of the inner cross section.

In the preferred exemplary embodiment illustrated according to FIGS. 1 to 32, on the one hand each spring arm 40 has, in the weakening zone 50 on its radially outwardly pointing side, a radial cutout 52, which preferably runs in the manner of a groove in the circumferential direction. On the other hand, the insert part 32 has, in the region of the spring arms 40 on its inner side pointing radially inward toward the conduit 6 and in the region of the deformation zones 49, an enlarged inner diameter. In this case, it is provided that the inner diameter adjoining the smallest diameter of the inner cone 16 is enlarged in the direction of the deformation zones 49 via cone sections 54 running at an angle. In this regard, particular reference is made to FIG. 3 and also to FIGS. 8 and 15. Accordingly, an edge 56 with an inner diameter which is greater than the outer diameter of the media conduit 6 (FIG. 3) is formed between the inner cone 16 and the cone sections 54 in the region of each spring arm 40. As a result of the inner contour described of the spring arms 40, a radial movement play which is sufficient for the detachment movement is provided. During the detachment movement, in each case the edge 56 of each spring arm 40 cannot come to bear on the conduit 6 beyond a certain radial excursion, as a result of which a further radial movement of each spring arm 40 then only still takes place in the region between the edge 56 and the free end 48 or the deformation zone 49 (as a result of the free ends 48 of the spring arms 40 being supported on the conduit 6 via the dirt seal 34).

An advantageous configuration of the invention will now be explained with reference to FIGS. 2, 3 and 5 and FIGS. 34, 35 and 37. Accordingly, the latching shoulder 42 of each spring arm 40 has a latching edge face 58 with an outer radius of curvature $R_a$, which is at least approximately equal to the inner radius $R_i$ of the base part 28. According to FIGS. 5 and 37, in the unstressed rest position of the spring arms 40 the latching edge faces 58 protrude radially outward beyond the inner circumference, which substantially corresponds to the outer circumference of the insert part 32, of the base part 28, in order that the latching edge faces 58 can engage in the latching openings 44. In this case, the radii mid-points of the radii of curvature $R_a$ of the latching edge faces 58 are radially offset with respect to the radii mid-point of the radius $R_i$. As a result of the detachment movement of the latching shoulders 42 radially inward, the mid-points of the radii $R_a$ then move toward the mid-point of the radius $R_i$, with the result that the latching edge faces 58 then also precisely correspond to the inner curvature of the base part 28. As a result, an improvement of the release of the latching during detachment is achieved by virtue of the latching shoulder 42 of each spring arm 40 with the latching edge face 58 coming completely free from the region of the latching opening 44 given the smallest possible radial excursion. If, in contrast to this, the radius of curvature $R_a$ were to be greater by the offset of the mid-points of the radii $R_a$ and $R_i$ according to FIGS. 5 and 37, each latching shoulder 42 would have to be moved further radially inward in order that the lateral end regions, which point in the circumferential direction, of the latching edge face 58 also come free from the latching opening 44. The detachment is likewise facilitated by this advantageous configuration.

Figure 23:
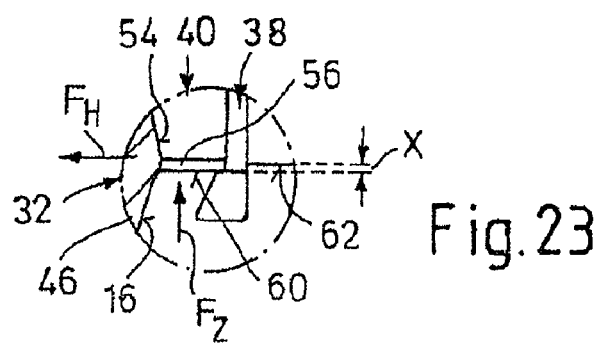
FIG. 23 shows an enlarged illustration of the region Y in FIG. 15.
Figure 24:
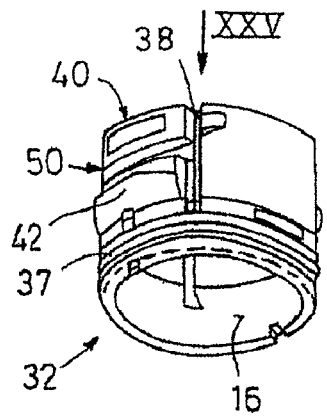
FIG. 24 shows a second embodiment of the insert part as an alternative to FIG. 4.
Figure 25:
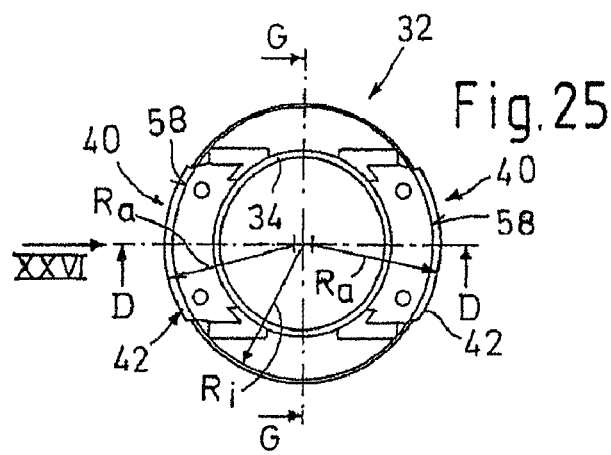
FIG. 25 shows an enlarged plan view of the insert part in the arrow direction XXV according to FIG. 24 (similar to FIG. 5)
Figure 26:
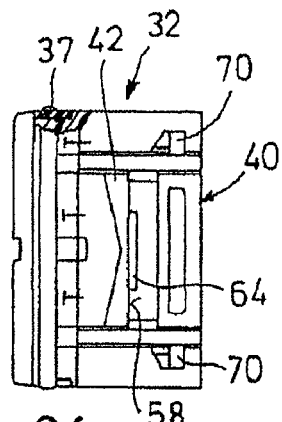
FIG. 26 shows a side view XXVI according to FIG. 25 (similar to FIG. 6)
Figure 27:
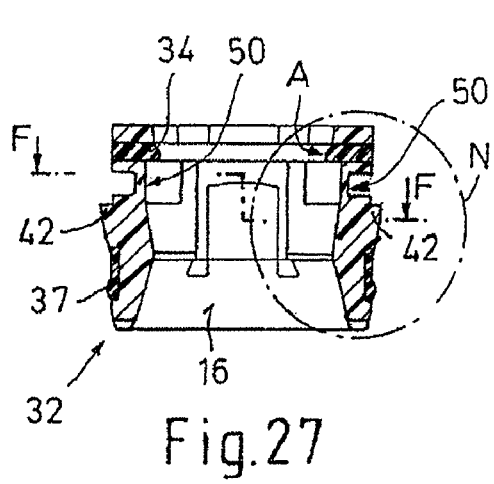
FIG. 27 shows a section D-D according to FIG. 25 (similar to FIG. 8)
Figure 28:
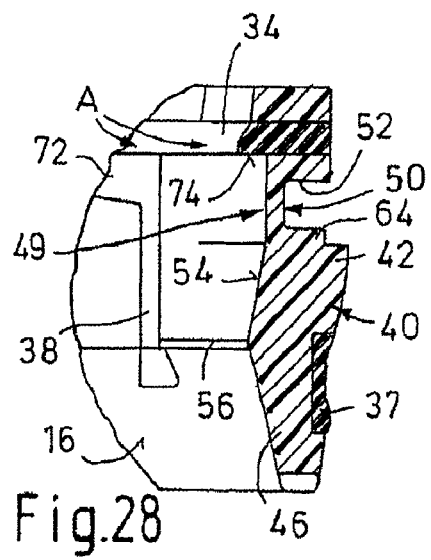
FIG. 28 shows an enlargement of the region N in FIG. 27.
Figures 33, 34:
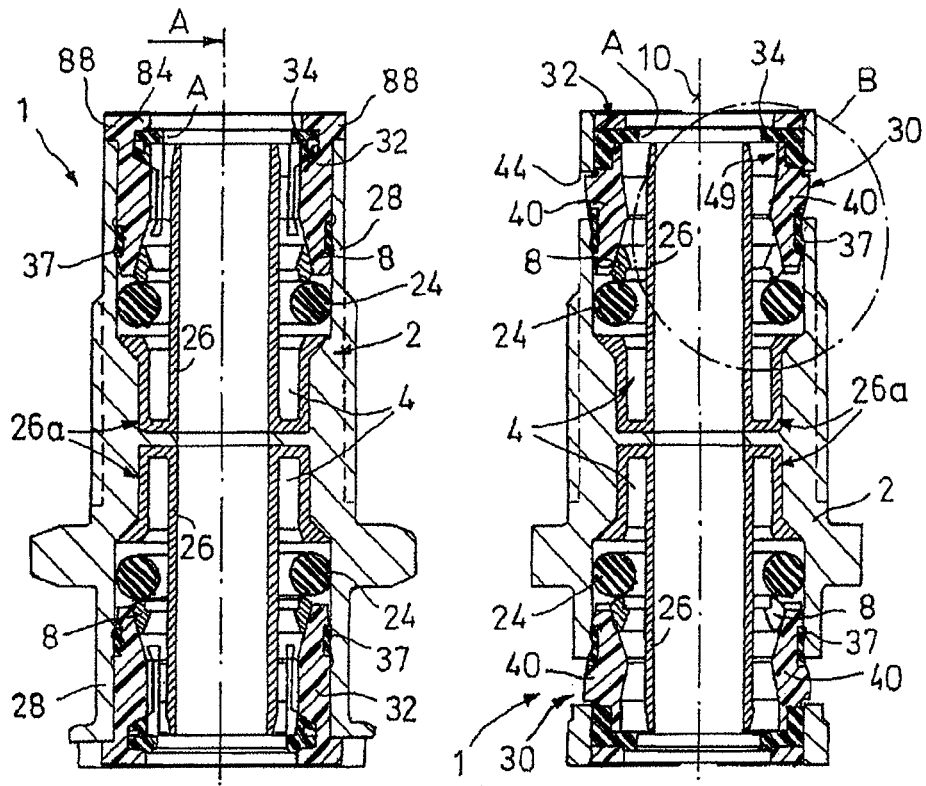
FIG. 33 shows an axial section of a second embodiment of a connection device according to the invention, by way of example in the form of a through-connector for two media conduits (not illustrated)
FIG. 34 shows a section in the plane A-A according to FIG. 33.

In a preferred configuration, it is also provided according to FIG. 23 that holding edges are formed within the insert part 32 adjacent to the inner cone 16 as an axial end stop opposing a movement of the clamping ring 8 directed in the withdrawal direction of the conduit 6, to be precise first holding edges 60 are formed in the region of the spring arms 40 and second holding edges 62 are formed in the regions lying between the spring arms 40 and in each case between the slots 38. As a result of the holding edges 60, 62, high withdrawal forces are made possible, which ensures a high level of protection against undesired detachment of the conduit 6. In this case it is provided according to FIG. 23 that the first holding edges 60 are offset with respect to the second holding edges 62 by an axial offset X in the direction of the inner cone 16 in such a way that the clamping ring 8 (not illustrated here), when subjected to a force $F_Z$ acting in the withdrawal direction of the conduit 6, first comes to bear only on the first holding edges 60, as a result of which the spring arms 40 are subjected to a radially outwardly acting holding force component $F_H$. In this case, the axial offset X is designed to be small, however, so that, after a deformation in the elastic region, the clamping ring 8 additionally comes to bear against the second holding edges 62, which further improves the protection against detachment. When the clamping ring 8 is bearing against the first holding edges 60, forces are therefore resolved, the radial component $F_H$ ensuring that the holding force of the elastic spring arms 40 is increased. As a result, very high withdrawal forces are achieved.

In particular in connection with the above-described configuration; it is furthermore advantageous if the latching shoulder 42 of each spring arm 40 has, in the region of its latching edge face 58, a stop element 64 in such a way that, in a state in which the conduit 6 is subjected to the force $F_Z$ in the withdrawal direction, the latching shoulder 42, in a position in which it engages in a defined manner in the latching opening 44 of the base part 28, is supported against a further radially outwardly directed movement, which in particular results from the above-described holding force component $F_H$. For this purpose, the stop element 64 is supported on the inner circumference of the base part 28 in the region adjoining the latching opening 44 (see in this regard FIGS. 2 and 3). As illustrated, the stop element 64 can be in the form of a shoulder on the latching edge face 58 (see in this regard, for example, FIGS. 6, 8 and 10). The stop element 64 therefore delimits the spring excursion radially outward whilst loading the connection device 1. This avoids a situation in which, in particular as a result of the radial holding force component $F_H$, the spring arms 40 could be pushed too far radially outward. As a result of such an excessive deformation of the insert part 32, the latter could possibly jam during the detachment process and/or the clamping ring 8 could be ripped out despite the axial stop at the holding edges 60, 62. These problems are advantageously avoided by the stop elements 64; the detachability is improved whilst ensuring high withdrawal forces.

Figure 35:
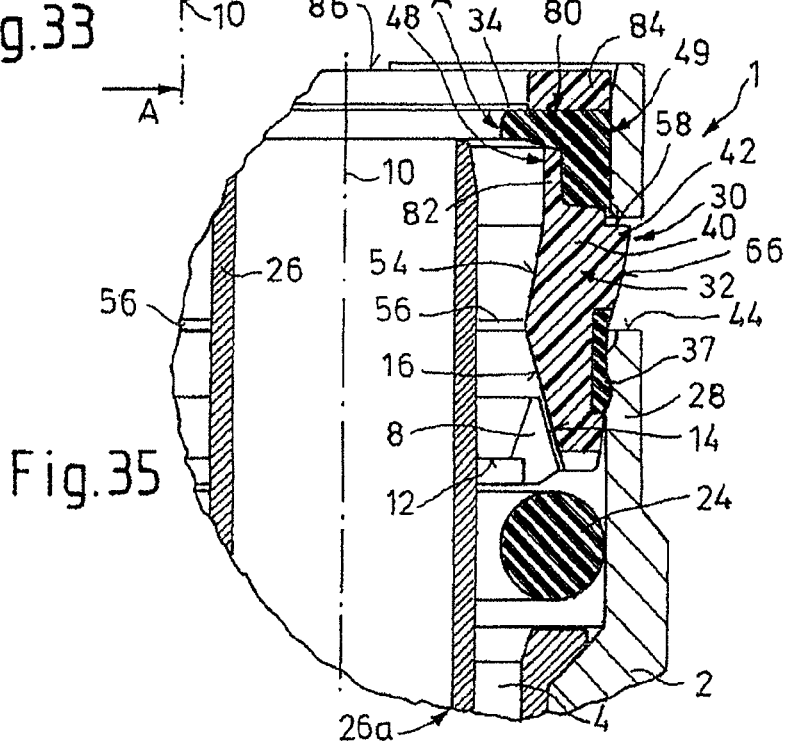
FIG. 35 shows an enlargement of the region. B in FIG. 34.
Figure 43:
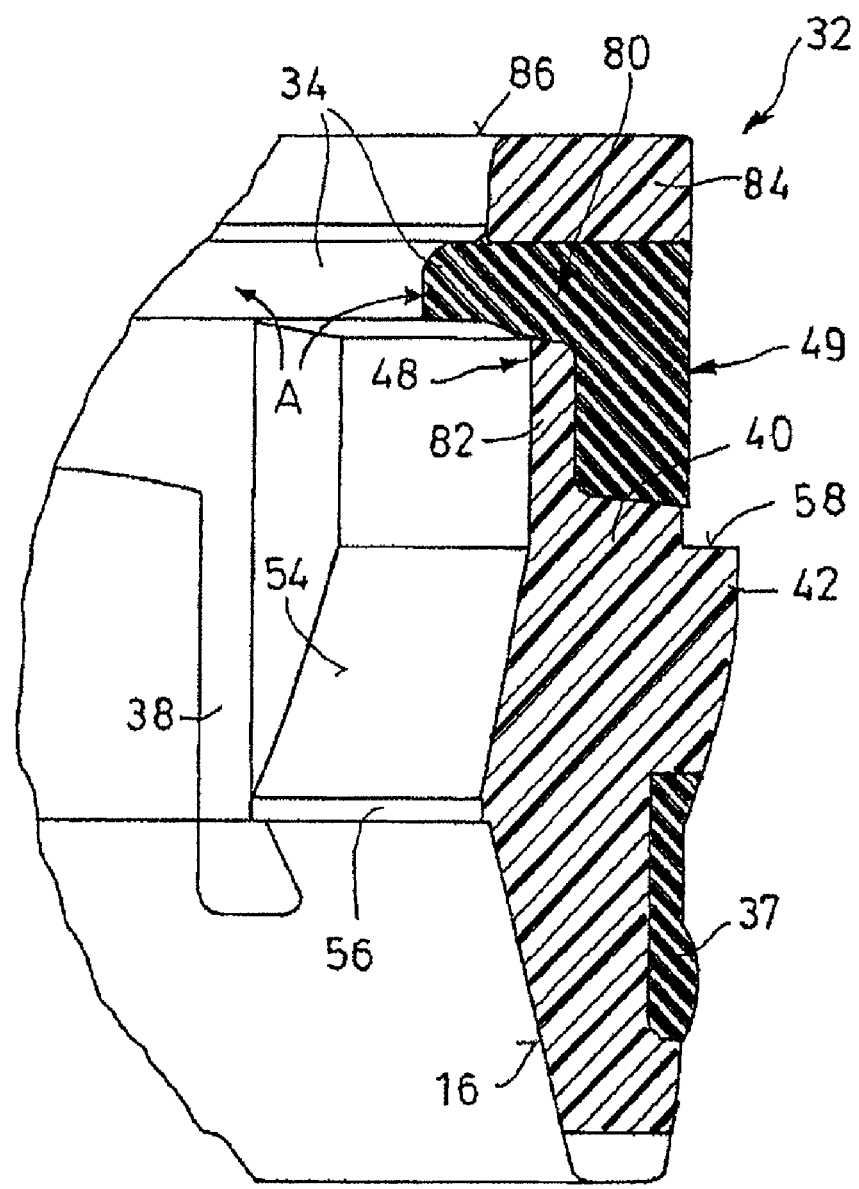
FIG. 43 shows a very enlarged view of the region N in FIG. 38.

As can furthermore best be seen in the enlarged illustrations in FIGS. 3 and 35, each latching shoulder 42 advantageously has, on its side protruding radially outward, when viewed in the axial direction, a rounded-off flank face 66. As a result of the fact that the contour of the outer region is rounded off in this way, undesired compressions in the region between the latching edge face 58 and the base region, which adjoins the ring section, of the spring arms 40 are avoided which can result owing to the bending during unlocking of the spring arms 40. In addition, the frictional forces when withdrawing the unlocked insert part 32 are reduced.

Finally, in an advantageous configuration the dirt seal 34 is chambered axially on both sides on the free mouth side at least in subregions of its circumference. On the mouth side, this is achieved by injection-molded web sections 68 comprising the relatively hard first plastic material (see, for example, FIGS. 3, 8 and 21). These web sections 68 also act as a supporting ring for the dirt seal 34, with the result that good dimensional stability is achieved.

FIGS. 24 to 32 illustrate a second embodiment of the insert part 32, in which in particular the region of the dirt seal 34 is modified with respect to the first embodiment shown in FIGS. 1 to 23. In order to ensure a good sealing effect toward the inserted media conduit 6 for providing safe dirt sealing as a result of relatively high radial compression, but at the same time to keep the plugging force to be applied for inserting the conduit 6 and also the radial detachment force $F_L$ (cf. FIG. 3) low, this embodiment according to FIGS. 29 to 32 provides that tangential or secant-like recesses 70 are formed in the region of the longitudinal slots 38 between the relatively soft plastic material and the relatively hard plastic material radially outside and axially beneath the region of the dirt seal 34 (see also FIGS. 39 and 42). This can be achieved in terms of molding technology by corresponding cross-slides. In this case, according to FIGS. 31 and 32 the dirt seal 34 is supported in the region of the recesses 70 axially in the insertion direction 20 (cf. FIGS. 1 to 3) via webs 72 comprising the elastic material. Furthermore, according to FIGS. 27 and 28 the region of the largest inner cross section of the weakening zone 50 according to the invention of each spring arm 40 directly adjoins a radial face 74, which points in the insertion direction 20, of the dirt seal 34. As a result of these described measures, a certain flexibility is achieved in the region of the dirt seal 34 given a good radial sealing effect in such a way that the radial compression of the dirt seal 34 has at most very little influence on the detachment force $F_L$ and on the plugging force.

The embodiment according to FIGS. 33 to 43 differs from the embodiments according to FIGS. 1 to 32 by a particular configuration of the deformation zone 49 according to the invention. In this case, the spring arms 40 are designed to be axially shortened in such a way that they, with their free ends 48, are decoupled from the mouth-side end of the sleeve-shaped insert part 32 via axial interspaces 80. In this case, the deformation zone 49 is formed by regions of an elastic plastic material, which are arranged in the region of the free spring arm ends 48 and in the interspaces 80 and are integral with the dirt seal 34 in such a way that, during the radial detachment movement of the latching shoulders 42, the free spring arm ends 48 are concomitantly moved radially under elastic material deformation of the elastic plastic material. In this regard, particular reference is made to the enlarged illustration in FIG. 43. Preferably, the free end 48 of each spring arm 40 is formed by an axial radially inner web section 82, whose radially measured thickness is reduced in comparison with the spring arm 40. In this case, the elastic plastic material forming the deformation zone 49 engages over the web sections 82 radially and axially in the direction toward the latching shoulders 42. As a result of this advantageous configuration, a ring section 84, which is continuous in the circumferential direction and comprises the first, dimensionally stable plastic material, can be formed at the mouth-side end of the insert part 32. This ring section 84 has a planar, front end ring face 86. This configuration results in improved axial support and covering (chambering) of the dirt seal 34 for the purpose of protection, for example, against a water jet (see in this regard in particular FIGS. 35, 38 and 43).

In a further advantageous configuration, preferably two mutually diametrically opposite, radially outwardly protruding shoulders 88 are arranged at the mouth-side end of the sleeve-shaped insert part 32 (see, for example, FIGS. 37 and 40). These shoulders 88 engage in corresponding cutouts of the base part 28 in such a way that they are used firstly for radially positioning the insert part 32 in the base part 28 and secondly as an end stop for the axial insertion limitation (see in particular FIG. 33).

The invention is not restricted to the exemplary embodiments described and illustrated, but also includes all embodiments with a similar effect within the context of the invention.

As a person skilled in the art will appreciate, the above description is meant as an illustration of implementation of the principles of this invention. This description is not intended to limit the scope or application of this invention in that the invention is susceptible to modification, variation, and change, without departing from the spirit of this invention, as defined in the following claims.

The invention claimed is:

1. A connection device for the plug connection of at least one media conduit, comprising a housing part with at least one receiving opening for inserting the at least one media conduit and a clamping ring, which is arranged in the receiving opening and interacts with an inner cone of the housing part so as to lock the at least one media conduit, the housing part being in two parts comprising an outer base part and an inner insert part, which is detachably connected thereto via a latching connection and which forms the inner cone, the insert part having, for the detachability of the at least one media conduit, at least two radially elastic spring arms, which extend from a region of the inner cone with their free ends in a direction toward a mouth side of the receiving opening, the spring arms engaging with radially outwardly protruding latching shoulders in corresponding latching openings of the base part, the latching shoulders, for detachment purposes, moving radially inward into a detaching position, which releases the latching shoulders from the latching openings, a dirt seal being arranged in a region of the spring arm free ends so as to bear circumferentially on the at least one media conduit, and a deformation zone that is deformable and located between the dirt seal and the latching shoulders, wherein the latching shoulders of the spring arms are decoupled from a sealing region of the dirt seal with respect to a radial detachment movement via the deformation zone.

2. The connection device as claimed in claim 1, wherein the insert part is in the form of a sleeve, the spring arms being formed by longitudinal slots, which run starting from a ring section, which is closed circumferentially and has the inner cone, as far as the free ends of the spring arms.

3. The connection device as claimed in claim 2, wherein the insert part comprises a first, relatively hard and dimensionally stable plastic material, and the dirt seal is integrally formed cohesively from a second, relatively softer and elastic plastic material, the second, elastic plastic material also filling the longitudinal slots between the spring arms.

4. The connection device as claimed in claim 3, wherein the spring arms with their free ends are decoupled from a mouth-side end of the insert part via axial interspaces, the deformation zone being formed by regions of an elastic plastic material which are arranged in the region of the spring arm free ends and in the axial interspaces and are integral with the dirt seal, in such a way that on the radial detachment movement of the latching shoulders, the spring arm free ends are concomitantly moved radially under the elastic material deformation of the elastic plastic material.

5. The connection device as claimed in claim 4, wherein the free end of each spring arm is formed by an axial, radially inner web section, whose radially measured thickness is reduced in comparison with the spring arm, the elastic plastic material forming the deformation zone engaging radially and axially over the web sections.

6. The connection device as claimed in claim 4, wherein a ring section, which is continuous in the circumferential direction and is made from the first, dimensionally stable plastic material, is formed at the mouth-side end of the insert part.

7. The connection device as claimed in claim 1, wherein each spring arm has, as a deformation zone, a weakening zone with reduced flexural strength in such a way that, when the free spring arm end is radially supported via the dirt seal on the conduit, the latching shoulder is capable of moving radially inward into its detachment position under bending deformation of the weakening zone.

8. The connection device as claimed in claim 7, wherein the weakening zone of each spring arm is arranged axially between the latching shoulder and the free spring arm end, which is in the region of the dirt seal.

9. The connection device as claimed in claim 7, wherein the weakening zone of each spring arm is formed by a cross-section reduction by at least 25%, of the original spring arm cross section.

10. The connection device as claimed in claim 7, wherein each spring arm has, in the weakening zone on its side which points radially outward, a radial cutout, which preferably runs in the manner of a groove in the circumferential direction.

11. The connection device as claimed in claim 1, wherein the insert part has, in a region of the spring arms pointing radially inward toward the at least one media conduit and in a region of the deformation zone, an enlarged inner diameter.

12. The connection device as claimed in claim 11, wherein the enlarged inner diameter adjacent to a smallest diameter of the inner cone is enlarged via cone sections in a direction toward the deformation zone.

13. The connection device as claimed in claim 12, wherein an edge with an inner diameter which is larger than an outer diameter of the media conduit is formed between the inner cone and the cone sections in the region of each spring arm.

14. The connection device as claimed in claim 1, wherein the latching shoulder of each spring arm has a latching edge face with an outer radius of curvature, which is at least approximately equal to an inner radius of the base part.

15. The connection device as claimed in claim 1, wherein first holding edges in a region of the spring arms and second holding edges in regions lying in a circumferential direction between the spring arms are formed within the insert part adjacent to the inner cone as an axial end stop for the clamping ring, the first holding edges being offset with respect to the second holding edges by an axial offset in a direction of the inner cone in such a way that the clamping ring, when subjected to a force acting in a withdrawal direction of the conduit, first comes to bear only against the first holding edges and, as a result, the spring arms are subjected to a radially outwardly acting holding force component.

16. The connection device as claimed in claim 14 wherein the latching shoulder of each spring arm has, in a region of the latching edge face, a stop element in such a way that, in a state in which the at least one media conduit is subjected to a force in a withdrawal direction, the latching shoulder, in a position engaged in a defined manner in the latching opening of the base part, is supported against a further radially outwardly directed movement, which results from a holding force component.

17. The connection device as claimed in claim 1, wherein each latching shoulder has a flank face, which is rounded off when viewed in an axial direction.

18. The connection device as claimed in claim 1, wherein the dirt seal is chambered axially on both sides on a free mouth side, at least in subregions of its circumference.

19. The connection device as claimed in claim 1, wherein at least two diametrically opposite, radially outwardly protruding shoulders are arranged at a mouth-side end of the insert part.

* * * * *